United States Patent
Barr

[19]

[11] Patent Number: 5,997,672
[45] Date of Patent: Dec. 7, 1999

[54] GLASS PHOTO TILES

[76] Inventor: Paula Barr, 144 E. 24th St., Apt. AD, New York, N.Y. 10010

[21] Appl. No.: 08/877,298

[22] Filed: Jun. 17, 1997

Related U.S. Application Data

[60] Provisional application No. 60/019,848, Jun. 17, 1996.
[51] Int. Cl.$^6$ ..................................................... B32B 17/00
[52] U.S. Cl. ........................... 156/100; 156/102; 156/107
[58] Field of Search .................................. 428/13, 14, 49; 156/100, 102, 107; 65/107

[56] References Cited

U.S. PATENT DOCUMENTS

| | | | |
|---|---|---|---|
| 3,956,837 | 5/1976 | Itano | 428/13 X |
| 4,277,139 | 7/1981 | Cox | 428/13 X |
| 4,651,993 | 3/1987 | Netsch | 428/49 X |
| 4,889,572 | 12/1989 | Danico et al. | 428/49 X |
| 5,312,471 | 5/1994 | Jung | 428/542.8 X |

*Primary Examiner*—Timothy Speer
*Attorney, Agent, or Firm*—Leighton K. Chong

[57] ABSTRACT

A glass photo tile is formed by edge slumping an optically-correct glass front in a mold at a superheated temperature substantially above the annealing temperature of the glass, then cooling down the edge-slumped glass front in the mold through an anneal-cooling curve followed by cooling to room temperature. A photographic print is laminated in the glass front with a transparent adhesive layer, and a back mounting is installed with an adhesive layer against a back side of the print to seal the print in the glass tile. For optically correct glass having an annealing temperature of about 1000° F., the pre-heating temperature is within about 100° F. of the annealing temperature, and the superheated temperature is about 1400° F., and the anneal-cooling curve is a Fibonacci-formula curve. Preferably, the photographic print is laminated to the front glass with a silicone adhesive layer, and the back mounting is a ribbed glass sealed to the print with a silicone adhesive layer.

4 Claims, 3 Drawing Sheets

FIG. 4A
FIG. 5A
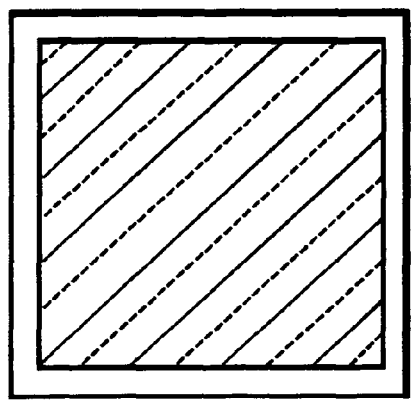
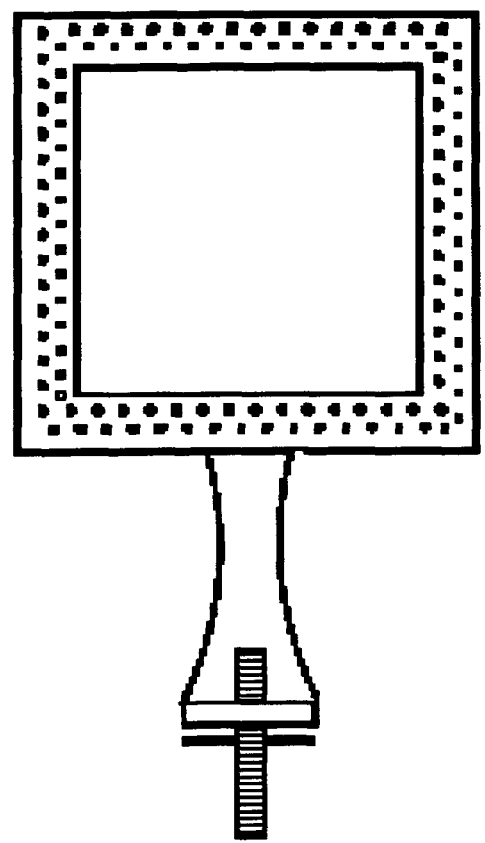
FIG. 4B
FIG. 5B

Glass Photo Tile before polishing

Glass Photo Tile polished & finished

GLASS PHOTO TILES

This patent application is filed based upon the domestic priority of U.S. Provisional Application 60/019,848 on Jun. 17, 1996, by the same inventor.

FIELD OF THE INVENTION

This invention generally relates to glass tiles and, particularly, a method and product of forming glass photo tiles.

BACKGROUND ART

The present inventor has pioneered in the artistic field of installing photographic artwork in public places. Such photographic artwork needs to be protected within a very durable, transparent, optically perfect structure to be viewed with the same photographic resolution and yet survive exposure to public use, moisture, environmental and chemical damage, and fading over time. Therefore, it would be desirable to hermetically seal photographic works in high-impact glass in a manner that would preclude the introduction of any moisture, environmental, or chemical attack.

Glass tiles have been produced by known glass molding techniques. Decorative materials have been encased in glass tiles by molding or laminating. However, conventional glass molding or laminating techniques have not been found suitable for encasing photographic works in glass tiles because of high finishing requirements, chemical intrusion, and/or lack of optical trueness.

SUMMARY OF INVENTION

The primary purpose of this invention is to archivally secure the use of photography in both interior and exterior spaces, which would other wise be unusable because of extreme maintenance and security considerations. The photo piece because of it's sensitive material and photogenic properties is limited to minimal use in many areas as a useful artifact. This invention provides a cost effective way to mass manufacture a chemically inert and a stable way to protect any photo piece. The issue of limited environmental use of a photo piece is overcome, and the origination of a new surfacing material for architecture is possible from this invention.

The finished manufactured item, for general purposes, is in appearance a glass tile encasing a photo piece. The tile's frontal surface is glass. This forward surface will be made of a variety of optically correct glass compositions including PYREX® glass, available from Owens Corning Corp., and others chosen for their physical as well as their visual properties. The main encapsulation performed by this frontal glass piece is performed by the nature of it's shape. This shape is a shallow dish, which gives room for the photo piece, laminating and binding materials. The closure of this composite is of a textured glass that matches standard glass tile requirements for increased surface adhesion to interior and exterior mounting surfaces.

The invention also encompasses unique glass molding techniques, which cut finishing to a minimum while still maintaining a high optical tolerance. When a tile with less optical perfection is made a form of open flame slump casting with die stamping will be used. For tiles which are not just decorative and require a museum quality optical tolerance a glass oven of a new design will be used. This oven computer controlled for critical temperature/change accuracy. The special proprietary configuration of the controller yield an optically near perfect tile dish which requires minimal finishing.

The tile's lamination of the front dish, special archival adhesives for bonding and the back recessed reed glass closure is an inherent part of the overall invention. This machine eliminates the possibility of air bubbles in the composite as well as the dangers in laminating irregular shapes at the speeds necessary for large production runs. It also will be able to deliver high yields with a minimum of rejects due to breakage, misalignment and operator error. All the uniqueness of material use, design and technology will become apparent from the detailed description of the production modes and embodiments of the invention considered in conjunction with the drawings, to be supplied, which should be construed in an illustrative and not limiting sense.

The invention relates to photography and glass tiles. The object of the invention is in an aesthetic and practical manner to create an archival system which allows the use of imagery in both interior and exterior spaces, which would have otherwise been impractical for numerous and divergent reasons:

extreme maintenance security vandalism costly production

I invented the glass photo/tile after the Metropolitan transit Authority (MTA) of New York City (NYC) asked me to design a photographic art site installation in the NYC subway system. They have an entire tile system dating back to the turn of the century. The MTA subways' tile inserts are historically significant and an artifact they are very proud to preserve. While surveying the sites I was intrigued with the use of tiles for decorative and functional purposes.

Over a period of 2 years I researched and produced samples made of PLEXIGLASS™ plastic sheets, LEXAN™ plastic sheets, NUVACOR™ plastic sheets, or glass sheets. For example, the NUVACOR™ plastic sheets tested were made of FORMICA® plastic material, and are commercially available from Nuvacor International L.P., New York, N.Y. The MTA test labs put these samples through their grueling tests: i.e. torching with an open flame, graffiti, extreme heat and cold, weather conditions, water and moisture. All the above combinations did not pass their tests for reasons as the tip/corner torch tests melted the plastic, pinholes in the silicone bond allowed moisture to cause mold and delamination.

Their findings led me to a glass face that is slumped. The side seams where the print material touches the glass & silicone are now located on the back. The back seam and seal are flush with the wall and the (often microscopic) ragged edge of the print is completely encapsulated in silicone, preventing it from air and water contamination.

The material combination of glass, ILFOCHROME™ color print material, available from Ilford Division of international Paper Company, in Illinois, and silicone creates a glass photo/tile that passes the code for hospitals, subways, public spaces and the most stringent of building regulations.

The glass photo/tile system permits images to be 'virtually seamless' and a photograph can extend forever. Tiling allows the designer to break up the image mathematically while the viewer's eye joins it together seamlessly.

Our invention is designed for life long installations as the color print material is guaranteed for 200 years and the glass is stable.

Other objects, features and advantages of the present invention are described in detail below in conjunction with the drawings, as follows:

BRIEF DESCRIPTION OF THE DRAWINGS

FIG. 4 illustrates a mold for slump molding of a glass tile for use in the glass photo tile process.

FIG. 5 illustrates a preferred burner structure for slump molding of a glass tile in the glass photo tile process.

PROCESS DESCRIPTION

Figure 1:
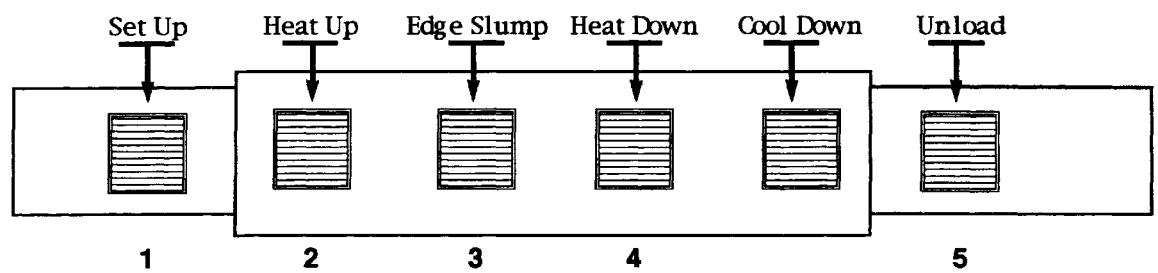
FIG. 1 illustrates the overall process steps for a method of forming a glass tile by slump molding for making glass photo tiles in accordance with the present invention.
Figure 2:
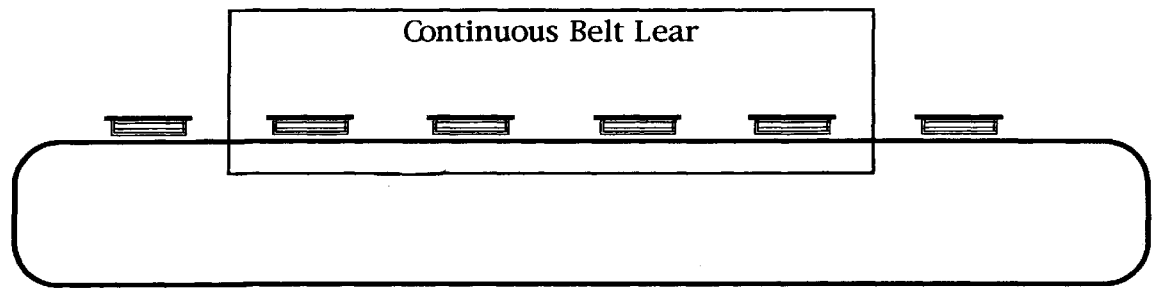
FIG. 2 is a schematic view of a continuous belt lear for forming a glass tile by slump molding in the glass photo tile process.
Figure 3:
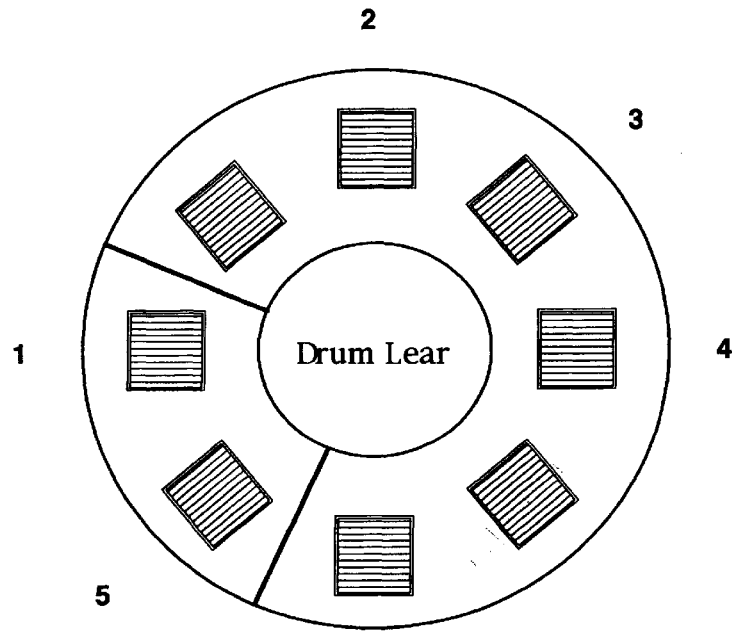
FIG. 3 is a schematic view of a continuous drum lear for forming a glass tile by slump molding for use in the glass photo tile process.

The edge bending process for glass tiles is divided into 5 steps as shown in FIG. 1. Two designs have been provided illustrating the technical process of the five steps; a continuous belt kiln, and a drum type kiln. The drum lear was seen at Bent Glassworks, Kew Gardens, Queens N.Y. where they manufacture glass lighting fixtures from plate glass. The process is similar with the exception of the special edge bending burner design. The continuous belt kiln, in which the molds for the tiles are moved on a belt through a stationary kiln structure, is shown in FIG. 2, and the drum type kiln, in which the molds for the tiles are rotated through a stationary drum structure, is shown in FIG. 3. A mold for slump molding is shown in FIG. 4, and burner in FIG. 5.

The kiln design is similar to normal continuous belt glass annealing kiln with the exception of the entire process occurring within the kiln itself. It will be designed to contain the 1400 degree max-heat of the process with kaowool board insulation or equivalent. This will also aid in the heating and cooling ends of the process. The belt kiln and or the drum kiln will have a variable speed motor for fine tuning. The entire process is anticipated to take approx. 26 minutes from set tip to unload.

The Burner design is unique to this process and is a square stainless steel tube with 3 rows of holes 1/32 inch diameters spaced every 3/8 inch, with solenoid-activated burner elements, providing heat of approximately 80,000 Btus. It is a Veturi-style burner design with interchangeable orifices for natural gas or liquid propane, and corresponds to step number 3 in the process.

The molds are made of cast iron with kaolin coating and are used all throughout the process. The molds may be made removable for cooling. The molds can incorporate a set up jig. Glass must be preheated and cooled according to annealing curve (for example, a progressive curve of the type referred to in mathematics as a Fibonacci curve) Computer control of steps 2, 3, and 4 through lear additional steps may be necessary.

Description of the Steps

1 Set-up of glass on mold must be accurate to avoid excess finish work

2 Preheat Mold moves to preheat area within kiln. Glass is heated to within 100 degrees of annealing point of particular glass—approx. 1000 degrees F. with a normal, and forced air, crossfire burner, 100,000 btus., controlled via computer, thermocouple, and actuator valve assembly, with continuous pilot ignition.

3 Edge Slumping Glass moves into position under special burner. The burner is activated, via solenoid, super heating edge to drop over mold.-approx. 1400 degrees F. (Possibility of a mold to press edges down into place may be a good addition at this point or step after). Piece is finished at this point.

4 Anneal Cooling down must pass through an appropriate annealing curve approx. 1000 to 700 degrees F. with a normal gas, and forced air, crossfire burner, 100,000 btus., controlled via computer, thermocouple, and actuator valve assembly with continuous pilot ignition.

(#4) Cooling Continued cooling down/from 700 degrees F. to room temp.

5 Unloading Tiles (at this point tiles may have to be placed into an additional cooling area for final cooling).

Print Cut/Tiled

Photographic print, negative or transparency is scanned into computer. ILFOCHROME™ prints are tiled using template design based on standard tiles. The tiling computer program automatically assigns a number to each tile. A color tile "map" is printed out. The ILFOCHROME™ prints are prepared with crop marks. The prints are then cut and numbered on the back—cross referencing the computerized tile map.

Print Encapsulated

Figure 6:
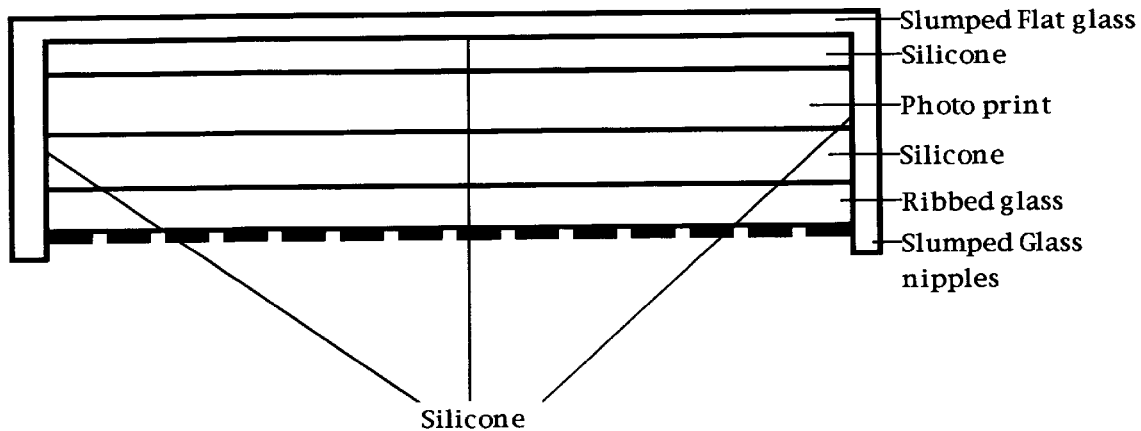
FIG. 6 illustrates in cross section the assembly of a photo print mounted on a back of ribbed glass to a slumped, flat glass front.

GE™ Contractors SCS 1000 silicone, available from General Electric Company, is applied to the front (emulsion side) of the Ilfochrome™ print. (see FIG. 6) The cut prints are laminated to the frontal glass layer using GE™ Contractors silicone. Using pressure sensitive rollers, to secure the adhesion, assuring that the ILFOCHROME™ print material surface will be flat and without air bubbles.

The laminates air dry for 24 hours. The GE™ Contractor's silicone is then applied to the back of the print/glass laminate. Using a blanket to cushion the print to glass laminates; the pressure sensitive rubber rollers adhere back to fronts. The tile sandwich of glass and ILFOCHROME™ print is set up and air dried for 24 hours.

Finishing of Glass Photo/Tile

Figure 7:
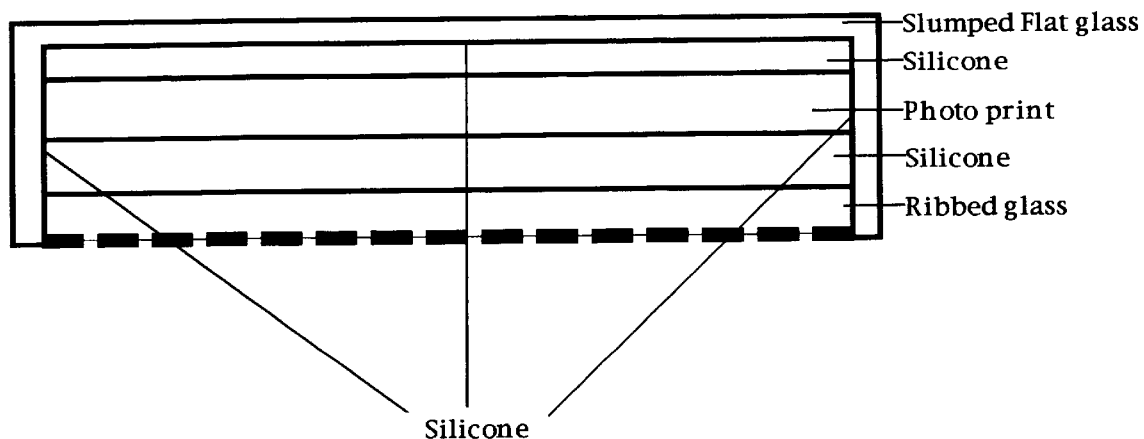
FIG. 7 illustrates in cross section a glass photo tile after finishing.

The photo/glass tile is finished by polishing the slumped glass 'nipples' edges with a carbon belt. (see FIG. 7) The finished tile is flush and sealed on the back.

The major characteristics of Glass Photo/Tiles provide unlimited commercial marketing applications. Using a photo tile either for a permanent display or a temporary one allows an advertiser a variety of options and a look that is not only different but durable. The sealed tiles are extremely resistant to atmospheric conditions, such as weather, dampness, dryness, heat, cold, or ultra violet light. They significantly reduce the impact of rough daily usage. Graffiti is easily removed from the glass. The tiles are difficult to scratch or break after installation. Tiles that are damaged can be replaced. Soot, oily films, and grease have no effect on the tiles or the image. Glass tiles once bonded into place are extremely difficult to pry loose and steal. The durable strong look of the tiles discourage would be vandals.

Market Applications

Specifically the physical properties of the material used can provide some insights into the tiles various applications.

A. The images are completely protected from climactic conditions because they are encapsulated in glass B. The images are printed on archival quality paper and are further protected by the use by glass which filters out UVL C. Glass is resistant to graffiti and surface abrasion. It can also be washed with almost any type of detergent or solvent without a problem D. The titles can be manufactured in any standard size or custom size and can be installed by any experienced tile installer. No special mounting base is required and the tiles meet all common building and fire codes.

In light of the basic physical characteristics the following uses suggest potential markets:

A. Wall murals of any dimension

B. Ceiling, floor, wall decorations

C Signage—airports, subways, public building

D. Logos—size flexibility, weather resistant

E. Elevators

F. Swimming Pools

E. Bathrooms—Showers, Tub areas

The versatility of the new concept product suggests direct marketing to the following potential users:

Architecture Firms

Developers

Transportation Authorities

Airports

Construction Companies

Theme Parks

Art Buyers

Park Departments

The market opportunities abound for this new, unique, artistic, architectural product. The Photo Glass/Tile is a creative, decorative and functional product that lends itself to divergent marketplaces.

Commercial & Mass Market

Decorative tiles for baby's rooms

Children's bathrooms

Photo labs offer amatures photographers converting pictures into tiles for kitchens, shower stalls, swimming pools & decks, & window sills Amateur photographers converting pictures into wall murals, water fountains, kitchens, shower stalls, swimming pools & decks, & window sills Licensing Commemorative & Souvenirs

I claim:

1. A method for forming a glass photo tile comprising the steps of:
    (a) preheating a mold, having a planar front portion surrounded by a surrounding edge portion so as to form a hollowed out space, at a temperature below the annealing temperature of a selected glass;
    (b) edge-slumping a glass piece into the mold by heating the edge portion of the mold to a superheated temperature substantially above the annealing temperature of the selected glass so that the glass slumps into the mold and forms a correspondingly planar glass front surface without optical distortion surrounded by a surrounding bent glass edge portion of a predetermined thickness;
    (c) cooling down the edge-slumped glass piece in the mold through an anneal-cooling curve followed by cooling to room temperature;
    (d) laminating a front side of a photographic print with a transparent adhesive layer to an inner surface of the planar glass front surface with side edges of the photographic print being protected by the surrounding bent glass edge portion; and
    (e) sealing the print in the edge-slumped glass piece by installing a back mounting with an adhesive layer against a back side of the print within the bent glass edge portion, whereby the back and edges of the print are entirely protected from chemical or environmental attack.

2. A method for forming a glass photo tile according to claim 1, wherein the glass is an optically correct glass having an annealing temperature of about 1000° F., the pre-heating temperature is within about 100° F. of the annealing temperature, and the superheated temperature is about 1400° F.

3. A method for forming a glass photo tile according to claim 1, wherein the anneal-cooling curve is a progressive, Fibonacci-type curve.

4. A method for forming a glass photo tile according to claim 1, wherein the photographic print is laminated to the front glass with a silicone adhesive layer, and the back mounting is a ribbed glass having a flat side laminated to the photographic print with a silicone adhesive layer.

* * * * *